(12) United States Patent
Day et al.

(10) Patent No.: US 7,152,205 B2
(45) Date of Patent: Dec. 19, 2006

(54) SYSTEM FOR MULTIMEDIA DOCUMENT AND FILE PROCESSING AND FORMAT CONVERSION

(75) Inventors: Young Francis Day, Plainsboro, NJ (US); Peiya Liu, E. Brunswick, NJ (US); Liang Hua Hsu, West Windsor, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 567 days.

(21) Appl. No.: 09/837,785

(22) Filed: Apr. 18, 2001

(65) Prior Publication Data

US 2002/0194227 A1    Dec. 19, 2002

Related U.S. Application Data

(60) Provisional application No. 60/259,610, filed on Dec. 18, 2000.

(51) Int. Cl.
*G06F 17/21* (2006.01)
*G06F 17/00* (2006.01)
*G06F 15/00* (2006.01)
*G06F 17/24* (2006.01)

(52) U.S. Cl. ........................ 715/523; 715/513
(58) Field of Classification Search ............. 715/500.1, 715/501.1, 513, 514, 517, 522, 523, 52
See application file for complete search history.

(56) References Cited

U.S. PATENT DOCUMENTS

| | | | |
|---|---|---|---|
| 5,860,073 A * | 1/1999 | Ferrel et al. ................. | 715/522 |
| 5,884,014 A | 3/1999 | Huttenlocher et al. ...... | 395/114 |
| 5,893,109 A * | 4/1999 | DeRose et al. .......... | 707/104.1 |
| 6,011,905 A | 1/2000 | Huttenlocher et al. ...... | 395/102 |
| 6,035,057 A | 3/2000 | Hoffman ..................... | 382/159 |
| 6,061,697 A * | 5/2000 | Nakao ........................ | 715/513 |
| 6,078,924 A | 6/2000 | Ainsbury et al. ........... | 707/101 |
| 6,094,649 A | 7/2000 | Bowen et al. .................. | 707/3 |
| 6,202,072 B1 * | 3/2001 | Kuwahara .................... | 715/513 |
| 6,613,098 B1 * | 9/2003 | Sorge et al. ................. | 715/503 |
| 6,715,129 B1 * | 3/2004 | Hind et al. .................. | 715/513 |
| 6,822,663 B1 * | 11/2004 | Wang et al. ................. | 715/854 |

(Continued)

OTHER PUBLICATIONS

U.S. Appl. No. 60/232,448.*

*Primary Examiner*—Heather R. Herndon
*Assistant Examiner*—Paul H. Nguyen-Ba
(74) *Attorney, Agent, or Firm*—Donald B. Paschburg; F. Chau & Associates, LLP

(57) ABSTRACT

An adaptive transformation and User Interface system enables transformation of a file or document (e.g. an SGML, XML, HTML or other multimedia file or document) from one format to another format. The transformation supports error correction, filtering and collation of elements of a source document for output and is performed in response to control information comprising transformation parameters. The system transforms a document encoded in a language including presentation style determination attributes from a first format to a different second format. The system includes a source of transformation parameters determining a desired presentation style and content structure as well as an input document processor. The input document processor transforms a received input document in a first format by parsing the input document and collating elements of the input document into a hierarchically ordered structure representing an intermediate document structure. The system employs a transformation processor for transforming the intermediate document structure into an output document with the desired presentation style of a second format in response to the transformation parameters.

20 Claims, 9 Drawing Sheets

U.S. PATENT DOCUMENTS

| | | |
|---|---|---|
| 6,928,487 B1* | 8/2005 | Eggebraaten et al. ....... 709/246 |
| 2002/0023113 A1* | 2/2002 | Hsing et al. ................ 707/513 |
| 2002/0035579 A1* | 3/2002 | Wang et al. ................ 707/513 |
| 2002/0082857 A1* | 6/2002 | Skordin et al. ................ 705/1 |
| 2002/0103737 A1* | 8/2002 | Briere ........................ 705/36 |
| 2002/0147747 A1* | 10/2002 | Zaharkin .................... 707/513 |
| 2002/0194070 A1* | 12/2002 | Totham et al. ................ 705/14 |
| 2003/0121000 A1* | 6/2003 | Cooper et al. .............. 715/513 |

\* cited by examiner

```
<!DOCTYPE VOLUME PUBLIC "-//MMDOC/DTD CBM//EN" "cbm.dtd
[
<!ENTITY d1400   SYSTEM "14000268.sgm">
<!ENTITY a14001  SYSTEM "graphics/140002681.aiu">
]>
```

205 ⎯ `<VOLUME> <TITLE>3.1 Description</TITLE>`
`<Sect> <Title>Blow-off System</Title>`
`&d1400;`
`</Sect>`
`</VOLUME>`

`<ANYDOC>`
`<TITLE>Blow-off System</TITLE>`
`<DOCHEADER Type="Regular" File="14000268.sgm" ID="N14000268>`
`<DOCDESC>Blow-off System</DOCDESC> </DOCHEADER>`

`<ANYDOCX>`
`<DOCNUM>3.1-1400 Version-C0268</DOCNUM>`
`<DOCDESC>Blow-off System</DOCDESC>`
`<ORDEREDHEAD> <TITLE>Blow-Off System Overview</TITLE> </ORDEREDHEAD>`
`<ANYDOCX2>`

207 ⎨ `<PARAX2> ... </PARAX2>`
`<PARAX2> ... </PARAX2>`
`<PARAX2> ... </PARAX2>`
`<PARAX2> ... </PARAX2>`

`</ANYDOCX2>`
`<ANYDOCX2>`
209 ⎯ `<FIGURE>`
`<TITLE>Figure 1. Blow-off System Overview (Typical)</TITLE>`
`<GRAPHIC Type="Raster" FileRef="140002681" FORMAT="GIF" WIDTH="500"> </GRAPHIC>`
211 ⎯ `</FIGURE> </ANYDOCX2>`
`<ORDEREDHEAD> <TITLE>Blow-Off Valves</TITLE> </ORDEREDHEAD>`
`<ANYDOCX2>`
`<PARAX2> ... </PARAX2>`
`<PARAX2> ... </PARAX2>`
`<PARAX2> ... </PARAX2>`
`</ANYDOCX2>`
`<DOCCTRL>`
`<DISTLEVEL>Technical Publication</DISTLEVEL>`
`</DOCCTRL> </ANYDOCX>`
`<DOCFOOTER>`
`<DOCNUM>3.1-1400</DOCNUM>`
`<DOCDATE> </DOCDATE> </DOCFOOTER> </ANYDOC>`

FIG. 2

```
<SGML TransformSpec>
305 ——⟨DefineConstant name=" ... " type=" ..." value=" ..."⟩⟨/⟩
     ...

⎧ <MappingRule orig=" ..." match=" ...">
     ⎪   ...
     ⎪     <ApplyMappingRule></>
     ⎪   </MappingRule>
307 ⎨   ...
     ⎪ <MappingRule orig=" ..." match=" ...">
     ⎪   ...
     ⎩ </MappingRule>

⎧ <Procedure name="">
309 ⎨   ...
     ⎩ </Procedure>
     ...
</SGML TransformSpec>
```

```
<!DOCTYPE SGML TransformSpec PUBLIC "-//MMDOC/DTD SGMLTRAN//EN">
<SGML TransformSpec>
  <DefineConstant name="$EM_max_card_chars" type="integer" value="500"></>
  <MappingRule orig="source" match="VOLUME/SECT">
    <CreateTreeSpace>CurrentCardSeq</>
    <CreateTreeSpace>CurrentCard</>
    <CreateTreeSpace>TempDocHeader</>
    <CreateTreeSpace>TempDocCtrl</>
    <CreateTreeSpace>TempFigure</>
    <CreateNode dest="target">PLANTLEVEL[1]</CreateNode>
    <ConnectNode orig="target">PLANTLEVEL[1],TITLE</ConnectNode>
    <CreateNode dest="CurrentCardSeq">CARDSEQ</CreateNode>
  </MappingRule>

<MappingRule orig="source" match="ANYDOC">
    <ApplyMappingRule></>
  </MappingRule>

<MappingRule orig="source" match="ANYDOC/DOCHEADER">
    <CopyTree orig="source" dest="TempDocHeader">DOCHEADER</CopyTree>
  </MappingRule>

<MappingRule orig="source" match="ANYDOCX">
    <CallProcedure>StartCard</CallProcedure>
    <ApplyMappingRule></>
  </MappingRule>

<MappingRule orig="source" match="ANYDOC/ANYDOCX/DOCNUM">
    <ValueOf orig="source" func="InstNum">.</ValueOf>
  </MappingRule>

<MappingRule orig="source" match="ANYDOC/ANYDOCX/DOCDESC">
  </MappingRule>

<MappingRule orig="source" match="ANYDOC/ANYDOCX/DOCCTRL">
    <CopyTree orig="source" dest="TempDocCtrl">DOCCTRL</CopyTree>
  </MappingRule>

<MappingRule orig="source" match="ORDERHEAD">
    <If test="ChildNumber(this)!=1">
      <Then>
        <CallProcedure>EndCard</CallProcedure>
        <CallProcedure>InsertFigure</>
        <DeleteTree orig="TempFigure">FIGURE</DeleteTree>
        <CallProcedure>EndCardSeq</>
        <CreateNode dest="target">PLANTLEVEL[2]</CreateNode>
        <ConnectNode orig="target">PLANTLEVEL[1],PLANTLEVEL[2]</>
        <CallProcedure>StartCardSeq</>
        <CallProcedure>StartCard</CallProcedure>
      </Then>
    </If>
    <CopyNode orig="source" dest="CurrentCard" mode="source" root="ANYDOCX">.</>
    <ApplyMappingRule></>
  </MappingRule>
```

FIG. 7a

```
        <MappingRule orig="source" match="PARAX2">
739 ――――<If test="CurrentCard.size>$EM-max-card-chars">
          <Then>
            <CallProcedure>EndCard</CallProcedure>
            <CallProcedure>StartCard</CallProcedure>
  743 {    <CreateNode dest="CurrentCard">ANYDOC2</CreateNode>
            <ConnectNode orig="CurrentCard">ANYDOCX,ANYDOCX2</ConnectNode>
          </Then>
          </If>
          <CopyNode orig="source" dest="CurrentCard" mode="source" root="ANYDOCX"></>
        </MappingRule>

745 ――<MappingRule orig="source" match="FIGURE">
  747 ――<CopyTree orig="source" dest="TempFigure">FIGURE</CopyTree>
        </MappingRule>

750 ――<MappingRule orig="source" match="ANYDOC/DOCFOOTER">
749 ――<CallProcedure>EndCard</CallProcedure>
  751 ――<CallProcedure>InsertFigure</>
        <DeleteTree orig="TempFigure">FIGURE</DeleteTree>
753 ――<CallProcedure>EndCardSeq</>
  755 ――<CallProcedure>InsertDocCtrlFooter</>
        </MappingRule>

{ <Procedure name="EndCardSeq">
          <If test="CurrentCardSeq.size> 0">
          <Then>
  756 {    <CopyTree orig="CurrentCardSeq"dest="target">CARDSEQ</CopyTree>
            <ConnectNode dest="target">PLANTLEVEL[current],CARDSEQ</ConnectNode>
            <DeleteTree orig= "CurrentCardSeq">CARDSEQ</DeleteTree>
          </Then>
          </If>
        <Procedure>

{ <Procedure name= "StartCard">
          <CreateNode dest= "CurrentCard">CARD</CreateNode>
          ...
  758 {  <CreateNode dest="CurrentCard">CARDX</CreateNode>
          <ConnectNode orig="CurrentCard">CARD,CARDX</ConnectNode>
          ...
          <CreateNode dest="CurrentCard">ANYDOCX</CreateNode>
          <ConnectNode orig="CurrentCard">CARDX,ANYDOCX</ConnectNode>

</Procedure>

{ <Procedure name="EndCard">
          <If test="CurrentCard.size>0">
          <Then>
  773 {    <CopyTree orig="CurrentCard" dest="CurrentCardSeq">CARD</CopyTree>
            <ConnectNode dest="CurrentCardSeq">CARDSEQ,CARD</ConnectNode>
            <DeleteTree orig="CurrentCard">CARD</DeleteTree>
          </Then>
          </If>
        <Procedure>
```

FIG. 7b

```
<Procedure name="InsertFigure">
  <If orig="TempFigure"test="!FIGURE">
    <Then>
    <CreateNode dest="TemoFigure">FIGURE</CreateNode>
    . . .
    <CreateNode dest="TemoFigure">GRAPHIC</CreateNode>
    . . .
    <ConnectNode orig="TempFigure">FIGURE,GRAPHIC</ConnectNode>
    </Then>
  </If>
  <SetCurrentNode orig="CurrentCardSeq" >CARDSEQ</SetCurrentNode>
  <ForEach select="CARD">
    <If test="!(CARDX/ANYDOCX/FIGURE)">
      <Then>
        <CopyTree orig="TempFigure" dest="CurrentCardSeq">FIGURE</CopyTree>
        <ConnectNode orig="CurrentCardSeq">ANYDOCX,FIGURE</ConnectNode>
      </Then>
    <If>
  </ForEach>
</Procedure>
```
775

```
<Procedure name="InsertDocCtrlFooter">
  <SetCurrentNode orig="target">PLANTLEVEL</SetCurrentNode>
  <ForEach select=".CARD">
    <SetAttribute element="CARD" name="ID" value="childnumer(this)" context="current"></>
    <CopyTree orig="source" dest="target">DOCFOOTER</CopyTree>
    <ConnectNode orig="target">this,DOCFOOTER</ConnectNode>
    <CopyTree orig="TempDocCtrl" dest="target">DOCCTRL</CopyTree>
    <ConnectNode orig="target">CARDX,DOCCTRL</ConnectNode>
  </ForEach>
</Procedure>
</SGMLTransformSpec>
```
779

FIG. 7c

```
<!DOCTYPE CardManual SYSTEM "cbm.dtd
[
<!ENTITY f14000268 SYSTEM "14000268.sgm">
<!-- Entity Declarations -->
]>
<CardManual name="31cbm">
<PlantLevel NAME="Blow-off System">
<TITLE>Blow-off System</TITLE>
&f14000268;
</PlantLevel>
</CardManual>

<CardSeq>
<CARD>
...
<FIGURE><TITLE>Figure 1. Blow-off System Overview (Typical)</TITLE>
<Graphic Type=Raster Fileref="1400/026801" Format=GIF Width"500" KKS=""VIDEONAME="">
</Graphic></FIGURE>
...
</CARD>

<Card>
...
<CARD>
</CardSeq>

<PlantLevel NAME="Blow-Off Valves">
<CardSeq>
<Card>
<TITLE>Blow-Off Valves 1</TITLE>
<DOCHEADER><DOCDESC>Blow-Off System</DOCDESC></DOCHEADER>
<CARDX>
<AUXCTRL>...</AUXCTRL>
<ANYDOCX>
<ORDEREDHEAD><TITLE>Blow-Off System Overview</TITLE></ORDEREDHEAD>
<ANYDOCX2>
<PARAX2>...</PARAX2><PARAX2>...</PARAX2>
</ANYDOCX2>
820 —<FIGURE><TITLE>No Figure</TITLE>
<GRAPHIC VIDEONAME="" WIDTH="500" KKS="" FORMAT=GIF TYPE="Raster" PID="" FILEREF="blank">
</Graphic><FIGURE>
</ANYDOCX>
<DOCCTRL><DISTLEVEL>Technical Publication</DISTLEVEL></DOCCTRL>
</CARDX>
<DOCFOOTER><DOCNUM>3.1-1400</DOCNUM><DOCDATE><DOCDATE></DOCFOOTER>
</CARD>

<Card>
...
</CARD>
</CardSeq>
</PlantLevel>
```

FIG. 8

SYSTEM FOR MULTIMEDIA DOCUMENT AND FILE PROCESSING AND FORMAT CONVERSION

This is a non-provisional application of provisional application Ser. No. 60/259,610 by P. Liu et al., filed Dec. 18, 2000.

FIELD OF THE INVENTION

This invention is related to an adaptive system and User interface for the processing and conversion of multimedia files and documents including SGML (Standardised General Markup Language) documents or XML (Extensible Markup Language) documents and other documents and file types, from one format to another format, for example.

BACKGROUND OF THE INVENTION

The conversion of files and documents from one format to another format is required in a number of situations. These include, for example, for importing and exporting files on a PC or server between different applications requiring different formats, for converting documents for communication in particular protocols and for creating new files or documents from one or more existing files and documents. In creating such a new document or file from existing files and documents, it is typically the case that a considerable degree of manual intervention is necessary. In the specific case of a document authoring process, this conventionally involves manually composing documents, using a proprietary desktop authoring software application (MSWord, or Interleaf, for example). Such manual formatting and authoring is a time consuming and error prone operation and for documents that have predetermined document structures, the process becomes a burdensome, repetitive task.

There are transformation languages used in defining document formats, document presentation style or in converting document formats. One such Transformation language is DSSSL (Document Style Semantics and Specification Language) ISO 10179, 1996—Information Technology, which is a Scheme-like declarative language used to specify the formatting and transformation of SGML documents. Another such language is XSL (Extendible Style Sheet Language) specified in an ISO standard, (see http://www.w3.org/TR/xsl/), used to specify the style of XML documents as well as to format and to transform XML documents. A further proposed language is XSLT, XSL Transformations (see http://www.w3.org/TR/xslt/) based on XSL and which is specifically designed for XML transformation. However, these languages either lack flexibility, or are difficult to use or fail to provide the range of functions required to support adaptive file and document transformation. In addition, these languages are typically non-intuitive and lack the ability to specify complex structural document changes and fail to support high-level manipulations.

Applications also exist (such as Oracle Reports) that allow the output of data in a User selectable tabular style and in a User selectable format (e.g. PDF or HTML), for example, these applications are also constrained by many limitations. Such applications typically do not support automated file and document format conversion, require considerable manual intervention, and typically produce output data suitable for paper delivery only. These applications fail to provide the logical data structure information required to format documents to the extent required for their communication in composite form via electronic means such as via the Internet, for example. These deficiencies and associated problems are addressed by a system according to the invention principles.

SUMMARY OF THE INVENTION

An adaptive system enables conversion of a file or document, e.g. an SGML (Standardised General Markup Language) document or XML (Extensible Markup Language) document, from one format to another format. The conversion system supports error correction, filtering and collation of elements of a source document for output and is performed in response to control information comprising transformation parameters. The system transforms a document encoded in a language including presentation style determination attributes from a first format to a different second format. The system includes a source of transformation parameters determining a desired presentation style and content structure as well as an input document processor. The input document processor transforms a received input document in a first format by parsing the input document and collating elements of the input document into a hierarchically ordered structure representing an intermediate document structure. The system employs a transformation processor for transforming the intermediate document structure into an output document with the desired presentation style of a second format in response to the transformation parameters.

BRIEF DESCRIPTION OF THE DRAWINGS

FIG. 2 shows an input document structure of a scrolled (i.e. non-fixed display presentation format) document in exemplary SGML format, according to invention principles.

FIG. 7 shows a preprocessed control information document used for transforming a processed document structure exemplified in FIG. 4 into the exemplary output document structure of FIG. 6, according to invention principles.

FIG. 8 shows a fixed display format SGML output document with the structure shown in FIG. 6, according to invention principles.

DETAILED DESCRIPTION OF THE DRAWINGS

Figure 1:
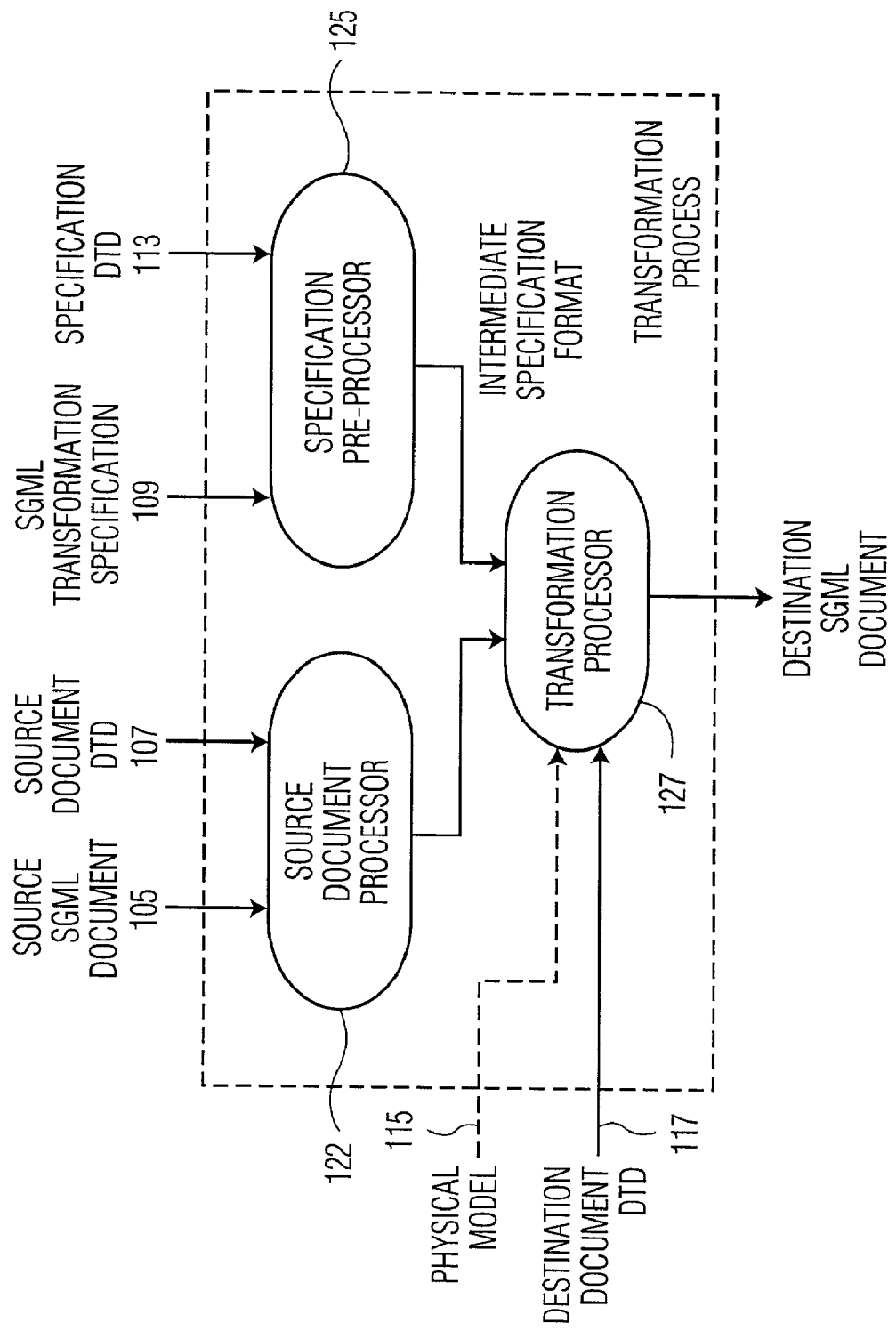
FIG. 1 shows an overview of the functional elements of the transformation process, according to invention principles.

The adaptive system of FIG. 1 enables conversion of a file or document encoded in a language including presentation style determination attributes (such as an SGML, XML or other document) from one format to another format. The conversion is controlled by control information in the form of another document or application (such as an SGML document—SGML ISO 8879: 1986 Text and Office System—Standards Generalized Markup Language, Geneva, 1986) determining transformation parameters. The system supports error correction, filtering, collation and restructuring of elements of a source document for presentation in one or more output documents in a desired format. The adaptive conversion system enables dynamic conversion of a document (in SGML or another format), originally created for desktop viewing, to produce a document for viewing on a Personal Data Assistant (PDA) device, PC, TV, cellular phone or other phone or palm pilot, for example. Similarly, the system supports dynamic communication of web pages, for example, between communication devices with different display formats. The system also enables the filtering of data in accordance with a User preference profile to exclude unwanted content or for parental control purposes, for example.

The principles of the invention may be applied to files or documents encoded in any language including presentation style determination attributes and are not restricted to documents or files encoded in SGML, XML, HTML or other Markup languages. Such files or documents may include, multimedia files streamed video or audio data, telephone messages, computer programs, Emails or other communications, for example, and the invention principles are applicable in communication systems for conveying such files or documents. Although, the system of FIG. 1 is described as processing SGML documents, this is for exemplary purposes only.

In overview, source document processor 122 of the adaptive system of FIG. 1 parses input SGML document 105 (exemplified in FIG. 2) and its associated Document Type Definition (DTD) 107. Processor 122 provides a resulting parsed instance tree to transformation processor 127. The instance tree may be referred to as a grove (exemplified in FIG. 4) and represents an intermediate document structure. Preprocessor 125 processes SGML transformation control information 109 (exemplified in FIG. 3) and including transformation parameters together with its associated Document Type Definition (DTD) 113. Preprocessor 125 provides resulting processed control information in the form of an intermediate control information format for facilitating document conversion (as exemplified in the structure representation of FIG. 5 and in the exemplary document of FIG. 7) to transformation processor 127. Transformation processor 127 applies the processed control information from preprocessor 125 and the input desired data format identifier (DTD 113) in converting the intermediate document structure from processor 122 to produce an output document (as exemplified in FIG. 8) with the desired presentation style.

In more detail, source document processor 122 of FIG. 1 parses input SGML document 105 and its associated Document Type Definition 107. An exemplary input SGML document 105 is shown in FIG. 2. The SGML format input document of FIG. 2 comprises a title 205, followed by a number of paragraphs 207 and a figure 209. The document of FIG. 2 is a scroll-based SGML document as distinct from a fixed display format document. A scroll-based document that is displayed using a browser such as a DynaText browser (available at http://www.engima.com/solutions/dynatext.htm) requires a User to scroll up and down to view the entire image content on a display screen. In contrast, a fixed display format document image displayed using a DynaText browser, for example, fits the available display screen. This renders scrolling to see the entire image content unnecessary. Processor 122 (FIG. 1) processes input document 105 and DTD 107 to provide an intermediate document structure.

Figures 3, 4:
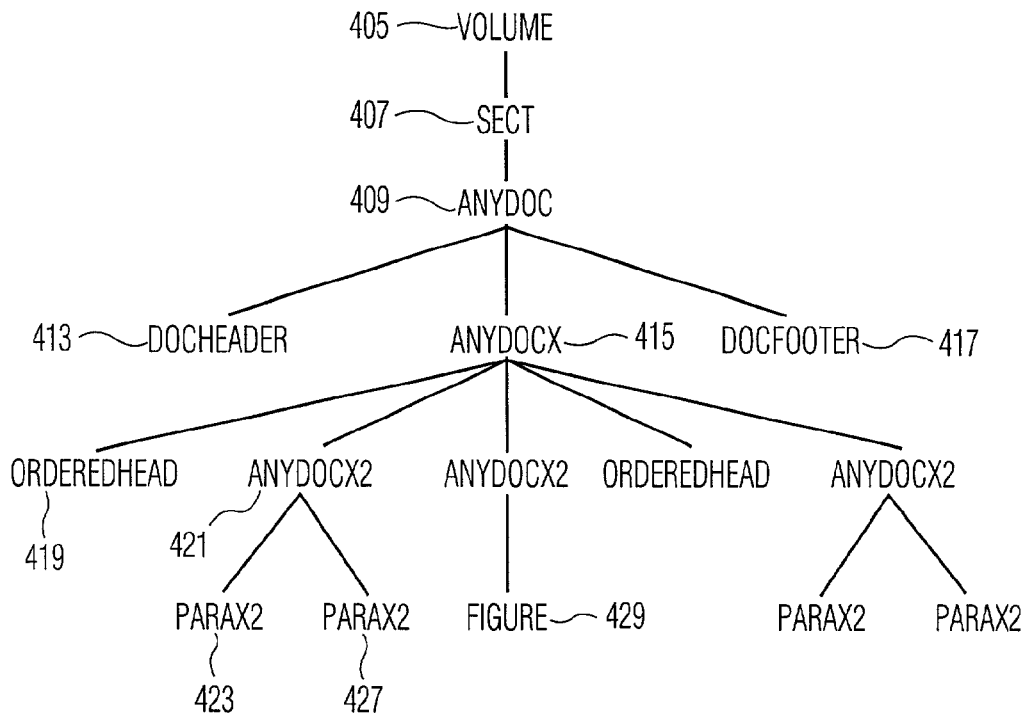
FIG. 3 shows an exemplary SGML format control information document template for determining Transformation parameters, according to invention principles.
FIG. 4 shows an input document structure following processing by a source document processor, according to invention principles.

Processor 122 processes the parsed input SGML document 105 to provide an intermediate document structure comprising a parsed instance tree structure (a grove) as shown in FIG. 4. The exemplary structure of FIG. 4 is composed of hierarchically ordered elements including VOLUME 405, SECT 407 and ANYDOC 409. Further, ANYDOC 409 is comprised of a DOCHEADER 413, DOCFOOTER 417 and body ANYDOCX 415. In turn ANYDOCX includes elements such as another heading ORDEREDHEAD 419, body ANYDOCX2 421 including paragraphs (PARAX2) 423 and 427, and includes figures such as Figure item 429 for example. Processor 122 also corrects errors occurring in the input document 105.

Preprocessor 125 processes SGML transformation control information 109 (exemplified in the template structure of FIG. 3) and including transformation parameters together with its associated Document Type Definition (DTD) 113. The transformation control information template of FIG. 3 incorporates constructs including constant definitions 305, transformation mapping rules 307 and optional transformation procedures 309. The syntax of the transformation control information is defined in the transformation specification Document Type Definition (DTD) 113. Preprocessor 125 (FIG. 1) processes SGML transformation control information 109 to provide intermediate control information (of structure exemplified in FIG. 5) for facilitating document conversion.

Figure 5:
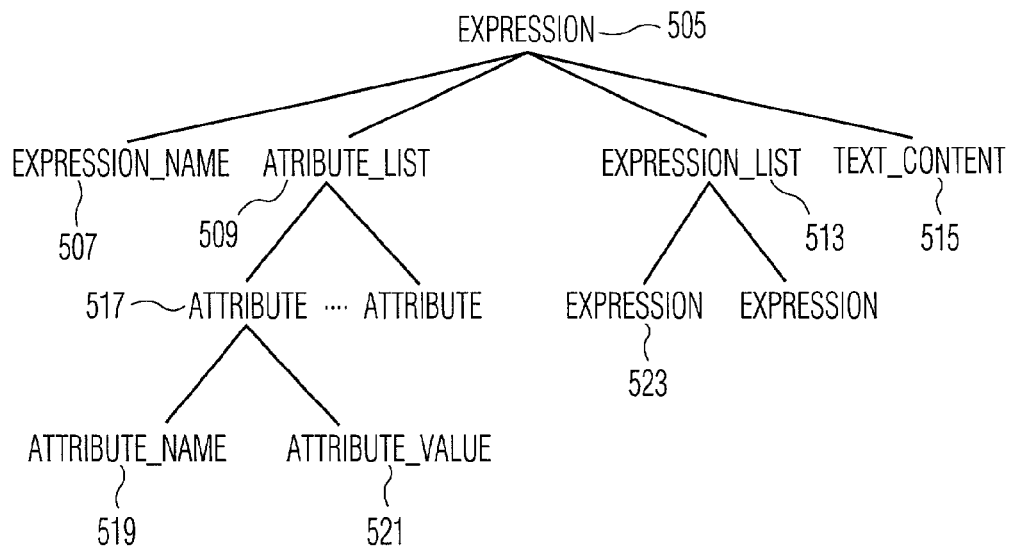
FIG. 5 shows a control information document structure following processing by a control information preprocessor, according to invention principles.

FIG. 5 shows a control information document in the form of a hierarchical tree structure following processing by control information preprocessor 125. The concept of "tree space" is employed in the described document processing system whereby documents are structured in a hierarchical tree format involving a dendritic type node-branch structure. The hierarchical tree structure employed in the intermediate control information of FIG. 5 includes single or multi-branch nodes in different tree spaces which are mutually exclusive. That is, nodes in different vertically derived tree structures from root expression 505 may not be connected. A similar type of tree structure is used in transforming the input document.

Specification preprocessor 125 processes SGML transformation control information 109 (exemplified in the template structure of FIG. 3) based on its Document Type Definition (DTD) 113. Specifically, preprocessor 125 parses control information 109 and applies the SGML compatible DTD defined constructs shown in Table I and represents each construct (an element in SGML in this example) in generalized form as intermediate control information as shown in FIG. 5. Preprocessor 125 generates a MappingRule list and a Procedure list. The generalized form shown in FIG. 5 includes root expression 505, expression name 507, attribute list 509, expression list 513 and text content 515. In addition, attribute list 509 includes attributes such as attribute 517 comprising attribute name 519 and value 521. Further expression list 513 includes expressions such as expression 523.

TABLE I

MappingRule: It is the fundamental construct, which matches a specific element specified by match attribute in the tree space denoted by the orig attribute and performs transformation actions as specified by the included expressions. We can "qualify" the match by specifying partial/complete context.
ApplyMappingRule: It means to apply mapping rules to the children of the
current SGML element being processed.
CopyNode: <CopyNode orig=". . ." dest=". . ." mode=". . ." root=". . .">SE[,TE]</>. It copies an element from "orig" to "dest" tree space.
An optional mode attribute specifies how the copied element is related to existing nodes in the destination tree space. A "mode" with value "source" means that if an element E1 is connected to an element E2 in the original tree space, then E1' (a copy of E1) is connected to E2' (a copy of E2) in the destination tree space. If only one element name (say SE) is specified in the content, it means element "SE" in the original tree space is
copied into the destination using the same element name. If there are two terms SE and DE specified, it means copying the SE element from the original to DE element in the destination. If mode is not specified, then a "dangling" node is created, which is supposed to be connected to a node in the destination tree space later.
CreateNode: <CreateNode dest=". . .">E</CreateNode>. It creates an SGML element (E) in destination tree space. The content of the newly-created element can be specified by an optional "content" attribute.
ConnectNode: <ConnectNode orig=". . . ">E1,E2</ConnectNode>. It connects two SGML elements E1 and E2 in the original tree space. E1 is the parent node while E2 is the child node. E2 is "dangling" by default.
CopyTree: <CopyTree orig=". . ." dest=". . ." mode=". .." root=". . .">E1[,E2]</CopyTree>. It copies a subtree rooted at element E1 in the original to the destination tree space. It has the same semantics as CopyNode except that a subtree instead of a node is copied.
Create TreeSpace: <CreateTreeSpace>tree_space_name</>. It creates a tree space.
DeleteTree: <DeleteTree orig=". . . ">root_name</Delete Tree>. It deletes a subtree with root specified as root_name, in the original tree space.
DefineAttribute: <DefineAttribute element=". . ." name =". . ." type= ". . ." value=". . ."></>. It defines name, type and optionally value of an attribute of an element.
Define Constant: <DefineConstant name=". . ." type=". . ." value =". . ." ></>. It defines a constant's name, type and value, which will be used in the specification later.
ForEach: <ForEach select=". . .">. . . </>. It is a looping structure that executes specified expressions for a number of times. The "select" criteria is relative to the current element and can be a descendant node.
Value Of: <Value Of orig=". . . " func="func_name"></Value Of>. It returns the text content of the specified element in the original tree space as the value of the function name specified in "func".
If, Then: <If test=". . . "><Then>. . . </Then></If>. This construct tests a condition (through attribute "test") of the current element (under a context) and executes the expressions specified inside "Then" expression if the test is successful. The test condition is of simple binary comparison (e.g., >, >=, <, <=, =, !=) or unary operations (e.g., !).
CallProcedure: <CallProcedure>procedure_name</CallProcedure>. It calls a pre-defined procedure as specified.
Procedure: It consists of ordered transformation expressions, which perform a specific task.
SetCurrentNode: <SetCurrentNode orig=". . . ">node_name</>. It sets the current node in the original tree space and is an alternative way to change the current processing node during navigation of a tree.
Skip Tree: It specifies no further processing to a tree rooted at the specified element.

Preprocessor 125 resolves conflicts arising due to incompatibility between the transformation parameters such as, (a) a page layout size, (b) number of characters per line, (c) number of lines per page, (d) font type and size, (e) heading allocation definition, (f) a scroll or non-scroll selection parameter, and (g) graphics layout definition and other parameters. Preprocessor 125 also resolves conflicts arising because of incompatibility between the transformation parameters and the desired output presentation format and detects and corrects errors in the transformation parameters and in control information 109.

Preprocessor 125 provides the resultant intermediate control information for facilitating document conversion (as exemplified in the structure representation of FIG. 5) to transformation processor 127. Specifically, in this embodiment preprocessor 125 provides an SGML compatible intermediate control information document, structured as in FIG. 5 and as exemplified in FIG. 7, to transformation processor 127.

Processor 127 (FIG. 1) applies the intermediate control information of FIG. 7 received from preprocessor 125, together with its associated input desired data format identifier (DTD 113), in transforming the intermediate document structure of FIG. 4 received from processor 122. Thereby transformation processor 127 produces an output document structure (as exemplified in FIG. 6) with a desired presentation style as determined by the control information. Processor 127 generates an output document by traversing a target hierarchical structure defined by the intermediate control information of FIG. 7 using a depth-first search. That is, processor 127 processes elements of a hierarchical target structure to be used for the output document by passing vertically downwards through each vertical path of the target structure. This is done foe each vertical path encountered in laterally traversing the structure and until all the nodes in each vertical path have been processed.

Processor 127 generates data elements at each node identified in traversing the target hierarchical structure (to be adopted by the output document). Specifically, at each node, processor 127 generates a start tag and either generates the content of the node element or traverses sub-elements of the node in accordance with the depth-first search procedure. Finally, the end tag of the element is generated and the output document is then validated by comparing the output document structure against definitions in DTD 113.

Processor 127 employs the language rules and constructs shown in Table 2 in applying the intermediate control information (of FIGS. 5 and 7) from preprocessor 125 for processing the intermediate document structure of FIG. 4 from processor 122. Firstly, processor 127 under direction of the intermediate control information applies a mapping rule to the root element of the intermediate document structure of FIG. 4. Further, under the direction of the intermediate control information, processor 127 applies a mapping rule for each element encountered during a depth-first traverse of the FIG. 4 intermediate document structure. Specifically, processor 127 matches an individual node in the FIG. 4 intermediate document structure against a corresponding mapping rule in the intermediate control information of FIG. 5. For this purpose, processor 127 sorts the applicable mapping rules in an ascending order to facilitate matching mapping rules and intermediate document structure nodes using a matching index. It is to be noted that other constructs may be employed that are not shown in Table 2 but that may be executed in a similar manner to those shown in Table 2.

TABLE 2

MappingRule: Execute the expression(s) in the expression_list in turn.
ApplyMappingRule: Process the children of the current node (element) by finding and applying a mapping rule for each of them. Each child node will then become the current node in turn.
CreateTreeSpace: Create a tree space node, with name and node_list as components, and put it into the tree space list.

TABLE 2-continued

DefineConstant: Store attribute name, type and value in a structure, which is stored in a constant variable list.
ForEach: In the current element, select all qualified elements based on the "select" attribute. For each qualified element, execute all expressions stored in this "ForEach"'s expression_list.
ValueOf: Return the text content of the specified node in the original tree space as the value of the function specified in func. The returned value is stored in a function list.
If: Check if the current element satisfies the "test" condition. If it does, execute the <Then> expression.
Then: Execute all expressions in the expression_list in order.
CallProcedure: Execute the specified procedure by checking the procedure list and executing all expressions in the procedure.

Processor 127 under direction of the intermediate control information from preprocessor 125 performs a number of functions including reordering, splitting, merging, and truncating elements of the intermediate document from processor 122. Similarly, processor 127, as directed by the intermediate control information, adopts the presentation style and display page layout desired for the output document and allocates the content of the intermediate document from processor 122 between successive pages in accordance with the determined display page layout. Further, processor 127 filters, the intermediate document from processor 122 to exclude predetermined elements and collates information elements in desired arrangements. Processor 127 also incorporates new information in the output document (including predefined information, figures and tables). This filtering, collation and insertion is done under the direction of the intermediate control information.

FIG. 7 shows a preprocessed control information document used for transforming a processed document structure representing the scrolled document shown in FIG. 4. The scrolled document of FIG. 4 is transformed into the fixed display format document represented by the output document structure of FIG. 6. The transformation of a scrolled format document into a fixed display (non-scrolled) format document illustrates the major features of the transformation specification. This transformation process divides a scroll-based document into smaller segments of fixed display format called cards, which are more suitable for interactive presentation. During the processing of the input scroll-based document of FIG. 4 by the control information of FIG. 7, a new fixed display format card is created either, (a) upon detection of particular characteristics in the input scroll-based document structure, or (b) upon the size of a current card exceeding a predetermined limit.

In transforming the FIG. 4 input document structure processor 127 (FIG. 1) employs the language rules and constructs shown in Table 2 in applying the intermediate control information (of FIG. 7). The document structure of FIG. 4 is translated into the output document structure shown in FIG. 6. The output document of FIG. 6 comprises a CardManual 605 (an encompassing document level) including a PlantLevel 607 (a subsidiary level) and optionally may include a CardSeq 609 (e.g., including a sequence of cards) or another PlantLevel 613 and another CardSeq 615. In turn a CardSeq such as CardSeq 615 contains one or more cards, e.g., 617. A card, e.g., card 617 contains three direct sub-levels comprising DOCHEADER 619, CARDX 621, and DOCFOOTER 623. Further, a CARDX such as CARDX 621 contains the document contents including an ORDEREDHEAD 627 (a heading), ANYDOCX 625 (document content) and Figures such as F*igure* 637. The content ANYDOCX 625 may include further content sub-divisions such as ANYDOCX2 of item 634.

The exemplary control information of FIG. 7 is applied by processor 127 (FIG. 1) to transform the scrolled document of FIG. 4 into the fixed display format document represented by the output document structure of FIG. 6, as follows. The control information procedure 705 of FIG. 7 determines that when a VOLUME/SECT tag is encountered in the input document of FIG. 4 (e.g., FIG. 4 items 405, 407), a number of items within the hierarchical tree structure of the target output document are defined for later use. Specifically, a PlantLevel node item (e.g., item 607 of FIG. 6) are created for the FIG. 6 target output structure. Procedure 705 also initiates the creation of a CardSeq level (e.g., item 609 of FIG. 6). Further, the FIG. 7 control information determines that, following detection of an ANYDOC tag within the FIG. 4 input document structure, an ApplyMappingRule function 713 initiates processing of the subsidiary items of an ANYDOC level. In particular, control information function 715 identifies a DOCHEADER (e.g., item 413 of FIG. 4) that is subsidiary to an ANYDOC level item (e.g., item 409) and function 717 initiates copying of the subtree of the DOCHEADER item of the input document of FIG. 4 to a TempDocHeader hierarchical location.

Further, control information function 719 initiates detection of an ANYDOCX level item in the FIG. 4 input document followed by the subsequent creation of a new fixed display format card. Upon detection of a value of ANYDOC/ANYDOCX/DOCNUM by the control information function beginning at rule 721, this value is saved as a parameter InstNum for later use. However, the detection of ANYDOC/ANYDOCX/DOCDESC by rule 723 does not initiate any action. If an ORDEREDHEAD item (e.g., item 419 of FIG. 4) is detected in the FIG. 4 input document by rule 729, the control information function 731 determines whether it is the first subsidiary item of that ORDEREDHEAD level. If it is not the first subsidiary level of the parent ORDEREDHEAD level, the control information employs procedure 735. Procedure 735 involves a number of functions including, the creation of a new fixed display format card after closing any existing card, the insertion of figures for previous cards which have no figure, the deletion of a figure in a TempFigure tree space. Procedure 735 also creates a new PlantLevel node item (e.g., item 613 of FIG. 6) and connects it to an existing one (e.g., item 607 of FIG. 6), and creates a new CardSeq level (e.g., item 615 of FIG. 6). Following procedure 735, control information function 737 copies an ORDEREDHEAD item from the input document of FIG. 4 to a CurrentCard item in the target document structure of FIG. 6. It is to be noted that the term CurrentCard as used herein identifies the target card currently being constructed and the term CurrentCardSeq identifies the sequence of cards currently being constructed.

Figure 6:
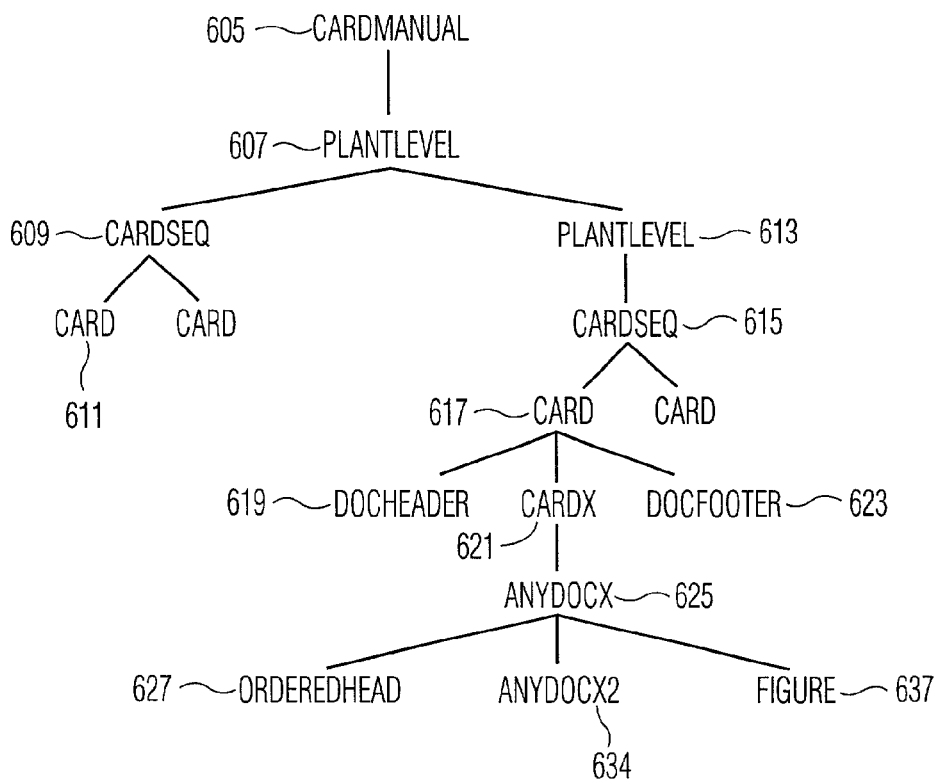
FIG. 6 shows the structure of an output document derived from transforming a processed input document using a preprocessed control information document, according to invention principles.

In processing a PARAX2 item (e.g. item 423 of FIG. 4) for incorporation in the target output document structure of FIG. 6, a mapping rule is applied facilitating conversion of the scroll based document of FIG. 4 to the fixed display format card based document of FIG. 6. Specifically, function 739 of FIG. 7 determines that if the size of a CurrentCard (that is, the content size of all the items comprising the CurrentCard and its subsidiary levels) is greater than the maximum allowable size for a fixed display format card, then function 743 is employed. Function 743 creates a new card after closing any existing card and copies the node itself from the FIG. 4 input document to a CurrentCard after creating an ANYDOX2 node so that PARAX2 can connect to it.

The control information detects a FIGURE tag in the FIG. 4 input document (e.g. item 429) using rule 745 and employs function 747 to copy this FIGURE item and its subsidiary items to a TempFigure location in the FIG. 6 output document. Further, upon detection of a DOCFOOTER (e.g. item 417) under ANYDOC (e.g. item 409) in the input document of FIG. 4, mapping rule 750 is invoked. In mapping rule 750, the current Card and current Cardseq are closed in functions 749 and 753 respectively and function 755 creates a DOC-FOOTER (e.g., item 623 of FIG. 6) for all fixed display format cards in the FIG. 6 output document. In addition, procedure EndCardSeq (item 756) initiated in function 753, copies a CARDSEQ level item (e.g., item 615 of FIG. 6) and connects it to a parent PLANTLEVEL node (e.g., item 613 of FIG. 6). A StartCard procedure 758 creates and connects CARD items (e.g. item 617) and other nodes in the current card tree space of FIG. 6. An EndCard procedure 773 copies a CARD level node in a current Card level within a current CardSeq level into the FIG. 6 output document.

Further, an InsertFigure procedure 775 determines if there is an existing figure in the TempFigure location in the FIG. 6 output document and in the absence of such a figure creates an empty figure. Procedure 775 also initiates a search of a CurrentCardSeq level and its subsidiary tree levels to insert a Figure node at appropriate places. In addition, InsertDocCtrlFooter procedure 779 is employed to initiate a search at the PLANTLEVEL of the output document structure of FIG. 6 to locate the CARD items. Procedure 779 copies DOCCTRL items (comprising document control information in a source document) into appropriate places in the FIG. 6 output document.

The control information of FIG. 7 may also be used to advantageously error correct, filter and edit information in the input document prior to its insertion in the output document. This includes excluding, replacing or inserting new information (including predefined information, figures and tables) in the output document as well as collating and grouping information in new arrangements (such as by transforming tabular row-column structures) under the direction of the control information. In addition, optional physical model characteristics may be applied by the control information to create some device-specific features within output documents (e.g., for transforming and creating XML format output documents). Physical model characteristics include display size, display resolution and display capability, for example.

FIG. 8 shows a fixed display format (card based) SGML output document with the structure shown in FIG. 6. The exemplary output document of FIG. 8 corresponds to the original source document of FIG. 2 transformed under the direction of the control information of FIG. 7. As a further illustration of one of the features of the transformation process, the absence of a figure following the ORDERED-HEAD . . . Blow-off Valves item (item 211 of FIG. 2) results in initiation of a new PlantLevel item and CardSeq item in the output document of FIG. 8. It also results in the control information of FIG. 7 employing an empty figure in the generated card (see item 820 of FIG. 8).

Figure 9:
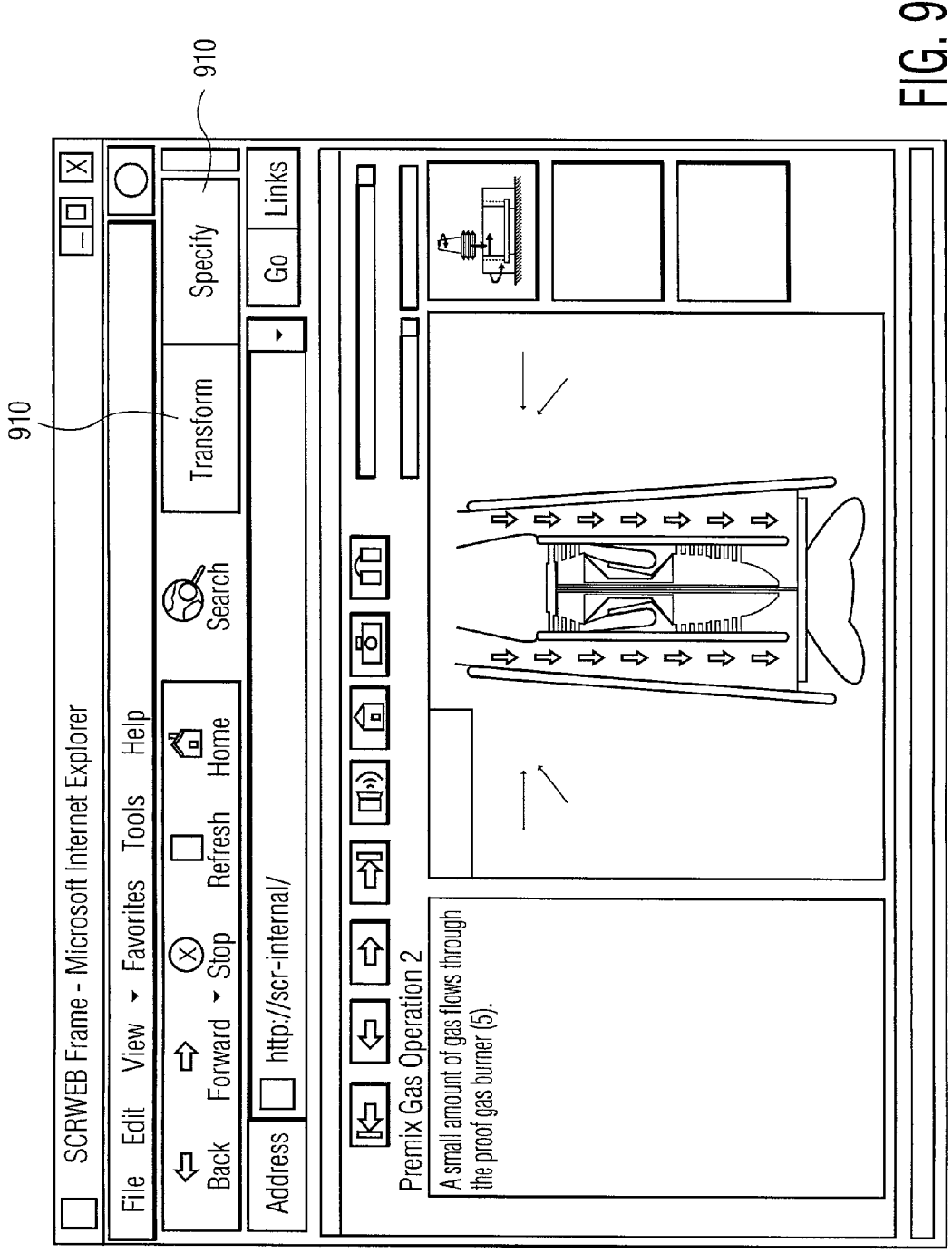
FIG. 9 shows a web browser User interface for initiating document transformation and for specifying input document format and output document format and transformation parameters, according to invention principles.

FIG. 9 shows a web browser User interface for initiating document transformation and for specifying input document format and output document format and transformation parameters. The web browser interface may be for example a Netscape Navigator, Microsoft Explorer or a DynaText type browser or another type of browser. Upon user activation of icon 910 a menu is generated permitting a user to specify an input document (and its disk drive location) to be transformed as well as its format (e.g. SGML, XML, HTML etc.). The menu also enables a user to enter the desired output format type (e.g. SGML, XML, HTML etc.) and file name (and disk drive location) of the desired output document as well as enabling the user to use an existing control information document or to create a control information document to be used for the transformation. The menu provides a range of user selectable template documents appropriate for particular document transformation processes and enables a user to enter particular transformation parameters for a selected control information template document. The transformation parameters are used to determine, a page layout, the number of characters per line or page, the number of lines per page, the desired font type and size, title or heading placement and definition, and other items. Once the document transformation process is defined in menus selected via icon 910, a user initiates the transformation process by activating icon 905. This initiates transformation of the specified input document under the direction of a specified control information document to produce a transformed output document using the principles previously described in connection with FIGS. 1–8.

The architecture of the system of FIG. 1 is not exclusive. Other architectures may be derived in accordance with the principles of the invention to accomplish the same objectives. Further, the functions of the elements of the FIG. 1 system may be implemented in whole or in part within the programmed instructions of a processor. In addition, the principles of the invention apply to conversion and transformation of any document encoded in a language including presentation style determination attributes and are not limited to SGML or XML format documents.

What is claimed is:

1. A system for transforming a document from a first format to a different second format, said document being encoded in a language including presentation style determination attributes, comprising:
   a source of transformation parameters determining a desired presentation style and content structure of an output document;
   an input document processor for transforming a received input document in a first format by parsing said input document and collating elements of said input document into a hierarchically ordered structure representing an intermediate document structure;
   a transformation processor for transforming said intermediate document structure into the output document with said desired presentation style ofa second format in response to said transformation parameters; and
   a preprocessor for resolving conflicts arising due to said transformation parameters in accordance with predetermined conflict resolution rules and wherein said transformation processor transforms said intermediate document structure into said output document with said desired presentation style of said second format in response to transformation parameters processed in accordance with said conflict resolution rules.

2. A system according to claim 1, including
   a preprocessor for correcting errors in at least one of, (a) said input document, and (b) said transformation parameters.

3. A system according to claim 1, including
   a filter for excluding undesired information from said output document.

4. A system according to claim 1, including
   a sorting processor for grouping selected elements of said input document into a desired arrangement in said output document.

5. A system according to claim 1, wherein
said input document and said output document are different and comprise one or more of, (a) an SGML document, (b) an XML document, (c) an HTML document (d) a document encoded in a language incorporating distinct content attributes and presentation attributes, and (e) a multimedia file.

6. A system according to claim 5, wherein
said transformation parameters identify input document type and output document type.

7. A system according to claim 1, wherein
said source of transformation parameters comprises an SGML document.

8. A system according to claim 1, wherein
said transformation processor transforms said intermediate document structure into said output document with said desired presentation style by performing at least one of, (a) a reordering operation, (b) a splitting operation, (c) a merging operation and (d) a truncating operation, on content elements of said intermediate document structure.

9. A system according to claim 1, wherein
said transformation processor transforms said intermediate document structure into said output document by,
adopting said desired presentation style determining a display page layout and
allocating content of said intermediate document structure between successive pages in accordance with said determined display page style.

10. A system according to claim 1, wherein
said transformation parameters include transformation rules constraining how said transformation processor transforms said intermediate document structure into said output document.

11. A system according to claim 10, wherein
said transformation rules map elements of said intermediate document structure to occupy nodes in a hierarchical tree structure allocated to said output document.

12. A system according to claim 1, including
a management processor for determining said transformation parameters in response to input data including, (a) identification of input document type and (b) identification of output document type including desired presentation style.

13. A system according to claim 1, wherein
said transformation parameters include at least two of, (a) a page layout size, (b) number of characters per line, (c) number of lines per page, (d) font type and size, (e) heading allocation definition, (fJ a scroll or non-scroll selection parameter, and (g) graphics layout definition.

14. An adaptive processing system for converting a document from a first format to a selectable different second format for presentation on a display device, said document being encoded in a language including presentation style determination attributes, comprising:
a management processor (a) for receiving user-provided input data selecting a second format from a plurality of selectable formats for presentation on a display device, and (b) for receiving user-provided transformation parameters determining a desired presentation layout and content structure;
an input document processor for processing a received input document in a first format by parsing said input document and collating elements of said input document; and
a conversion processor for converting said collated elements into an output document with said selected second format in response to said transformation parameters.

15. An adaptive processing system according to claim 14, wherein
said conversion processor converts said parsed and collated elements into an output document with said selected second format for presentation on at least one display device from, (a) a mobile or non-mobile phone, (b) a personal data assistant device, (c) a PC, (d) a TV (e) another processing device.

16. An adaptive processing system according to claim 14, wherein
said selected second format is selected from at least one of, (a) different display resolution formats and (b) a scrolling format and (c) a non-scrolling format.

17. A method for converting a document from a first format to a different second format, said document being encoded in a language including presentation style determination attributes, comprising the steps of:
receiving transformation parameters determining a desired presentation style and content structure of an output document;
resolving conflicts arising due to said transformation parameters in accordance with predetermined conflict resolution rules to produce compatible transformation parameters;
processing a received input document in a first format by parsing said input document and collating elements of said input document; and
converting said collated elements into the output document with said desired presentation style ofa second format in response to said compatible transformation parameters.

18. A method according to claim 17, wherein said converting step includes the step of
adopting a desired presentation style determining a display page layout; and including the step of
allocating said collated elements between successive pages in accordance with said determined display page layout.

19. A method for converting a document from a first format to a different second format, said document being encoded in a language including presentation layout determination attributes, comprising the steps of:
receiving a user-provided input document in a first format;
receiving a user-selected second format from a plurality of selectable formats;
receiving a user-selected template document from a plurality of selectable template documents;
receiving user-provided transformation parameters corresponding to the template document, the transformation parameters determining a desired presentation layout and content structure;
processing the received input document in the first format by parsing said input document and collating elements of said input document into a hierarchically ordered structure representing an intermediate document structure; and converting said intermediate document structure into the output document of the second format, the output document with said desired presentation layout and content structure corresponding to said template document and said transformation parameters.

20. A method according to claim 19, wherein said converting step includes the step of applying transformation rules mapping elements of said intermediate document structure to occupy locations allocated within said output document.

* * * * *